United States Patent [19]
Morin, Jr.

[11] Patent Number: 6,129,289
[45] Date of Patent: Oct. 10, 2000

[54] TRACTION DEVICE

[75] Inventor: Robert M. Morin, Jr., Lewiston, Me.

[73] Assignee: C.R.M. Enterprises, Inc., Lewiston, Me.

[21] Appl. No.: 09/163,408

[22] Filed: Sep. 30, 1998

[51] Int. Cl.⁷ .................................................. E01B 23/00
[52] U.S. Cl. ............................................................ 238/14
[58] Field of Search .................................. 152/208, 221, 152/222, 170; 238/14; 404/35

[56] References Cited

U.S. PATENT DOCUMENTS

| | | | |
|---|---|---|---|
| 2,619,289 | 11/1952 | Plante | 238/14 |
| 3,878,988 | 4/1975 | Blais | 238/14 |
| 3,997,110 | 12/1976 | Aumont | 238/14 |
| 4,568,020 | 2/1986 | Gallichan | 238/14 |
| 5,100,054 | 3/1992 | Fickett et al. | 238/14 |

FOREIGN PATENT DOCUMENTS

| | | | |
|---|---|---|---|
| 1018203 | 9/1977 | Canada | 238/14 |

*Primary Examiner*—Russell D. Stormer
*Attorney, Agent, or Firm*—Finnegan, Henderson, Farabow, Garrett & Dunner, L.L.P.

[57] ABSTRACT

A traction device for a wheeled vehicle arranged to be laid on the ground in engagement with a tread portion of a tire to provide a traction grip to the tire. The traction device includes a U-shaped frame and a pair of claws constructed at the ends of the U-shaped frame and arranged to engage into cavities between the tire treads by a lever action on the traction device. The traction device further includes a plurality of transverse braces extending between a pair of longitudinal bars of the U-shaped frame, each transverse brace having a pair of traction cleats extending downwardly to engage with the ground and to elevate the traction device from ground in some measure. One of the transverse braces is positioned at a region near a forward end of the U-shaped frame so that the corresponding pair of traction cleats maintain the device in a level attitude, prevent a lever action from being created, and prevent the U-shaped frame from tilting or projecting upwardly which may cause injury or property damage as the vehicle passes over the forward end of the device.

14 Claims, 3 Drawing Sheets

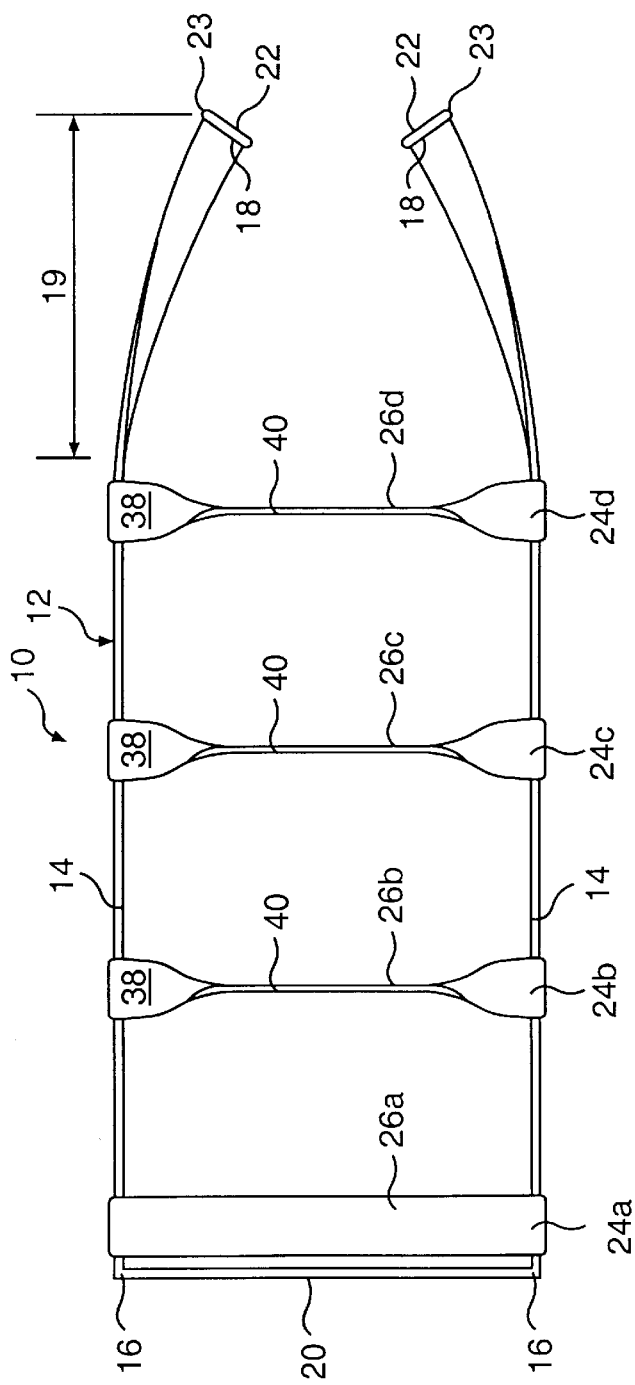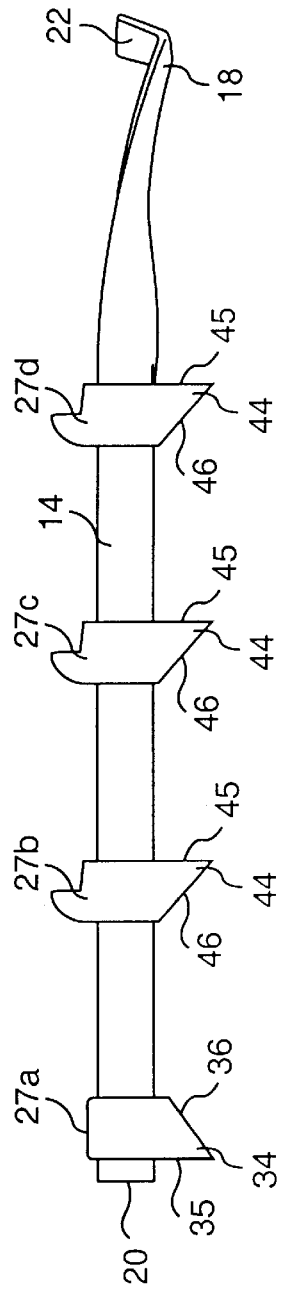

TRACTION DEVICE

BACKGROUND OF THE INVENTION

1. Field of the Invention

The present invention relates to a traction device for vehicles and, more particularly, to a traction device of the type adapted for use in aiding a wheeled vehicle stuck in ice, mud, snow, sand, or soft soil.

2. Description of the Related Art

Traction devices are known in the art for use with a wheeled vehicle stuck in ice, snow, mud, sand, or soft and slippery soil to provide a traction grip to a peripheral surface of a tire tread of the vehicle. The device has a frame-like structure a rear end of which is ahead of a stuck wheel in the direction toward which the vehicle is driven to provide a traction grip to the tire so that the vehicle can climb over the traction device, pull out of the soft ground, and drop over a front end of the frame-like structure back onto a more solid ground. When the vehicle is to be driven forward to a firm ground, the rear end of the device is placed in front of the stuck wheel, and when the vehicle is to be driven rearward, the rear end of the device is place behind the stuck wheel.

The traction device also has a series of spikes or cleats which are formed in pairs below the frame-like structure to anchor the device to the ground. A pair of claws are provided on the rear ends of the frame-like structure and are arranged to engage with the cavities between the treads of a tire. This traction device allows transition to a firm surface as the forward end of the device is pushed downward by the weight of the vehicle to ground level once the vehicle passes over the last pair of cleats. In practice, however, this type of traction device often causes damage to an undercarriage of a vehicle or injury to any person(s) standing nearby or pushing the stuck vehicle. This is because the rear end of the device is projected upwardly and out of the snow or mud once the weight of the freed vehicle passes over the forward most set of cleats. The force of the heavy steel projectile may cause substantial property damage or personal injury to the person(s) nearby.

In light of the foregoing, there is a need for an improved traction device which obviates the above disadvantages by providing a traction device that remains flat on the ground when the vehicle tire passes over the last set of aligned cleats. In addition, there is a need for a traction device that resists forward and rearward movements with respect to the ground and that allows the vehicle to advance through a smooth transition to the terrain at the end of vehicle passage over the device.

SUMMARY OF THE INVENTION

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purpose of the invention, as embodied and broadly described herein, the invention is directed to a traction device for use in aiding a wheeled vehicle stuck in ice, mud, snow, sand, or soft and slippery ground by providing a traction grip to a peripheral surface of the tire tread of the vehicle. The traction device comprises a U-shaped frame adapted to lie on the ground which includes a pair of longitudinally extending bars having forward ends and rear ends, and a transversely extending bar connecting the longitudinally extending bars on the forward ends. The U-shaped frame also includes a pair of claws. Each claw defines an upstanding plate portion integrally formed on each of the rear ends of the longitudinally extending bars. The pair of claws are adapted to grip the peripheral surface of the tire tread as the rear ends of the U-shaped frame are pressed into the ground. The traction device also comprises a plurality of transverse braces. Each transverse brace has a transverse portion and a pair of traction cleats. The transverse portion extends between the pair of longitudinally extending bars to provide traction grip to the vehicle tire. The traction cleats extend from each end of the transverse portion downwardly below the U-shaped frame for ground engagement and for elevating the traction device from the ground in some measure. In addition, the plurality of transverse braces further include a forward-most transverse brace having a transverse portion and a corresponding pair of traction cleats to maintain the traction device in a level posture as the tire of the vehicle passes over the forward end of the U-shaped frame.

In another aspect of the invention, the traction cleats of the forward-most transverse brace have angle points to restrict forward movement of the traction device as the vehicle travels thereon.

In another aspect of the invention, the invention is directed to a traction device wherein the transverse portion of the forward-most transverse brace is made of a flat strip laid horizontally to provide a gradual transition for the vehicle after passing over the traction device.

In yet another aspect of the invention, the plurality of transverse braces include the remaining transverse braces positioned at equal intervals. Each transverse brace has a transverse portion to provide a traction grip to the tire and a corresponding pair of traction cleats having angle points to restrict rearward movement of the traction device.

In still another aspect of the invention, the transverse portion of the remaining transverse braces are made of flat strips. Each transverse portion has horizontal side portions and a middle portion being twisted through about 90° so that the horizontal side portions create a bouyant force to sustain the weight of the vehicle thereby impeding the vehicle from sinking into the ground.

It is to be understood that both the foregoing general description and the following detailed description are exemplary and explanatory only and are not restrictive of the invention as claimed. Additional advantages will be set forth in the description which follows, and in part will be understood from the description, or may be learned by practice of the invention.

BRIEF DESCRIPTION OF THE DRAWINGS

The accompanying drawings, which are incorporated in and constitute a part of this specification, illustrate one embodiment of the invention and, together with the description, serve to explain the principles of the invention. In the drawings, FIG. 1 is a top view of a traction device in accordance with a preferred embodiment of the present invention;

FIG. 2 is a side elevation of the traction device shown in FIG. 1;

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 3:
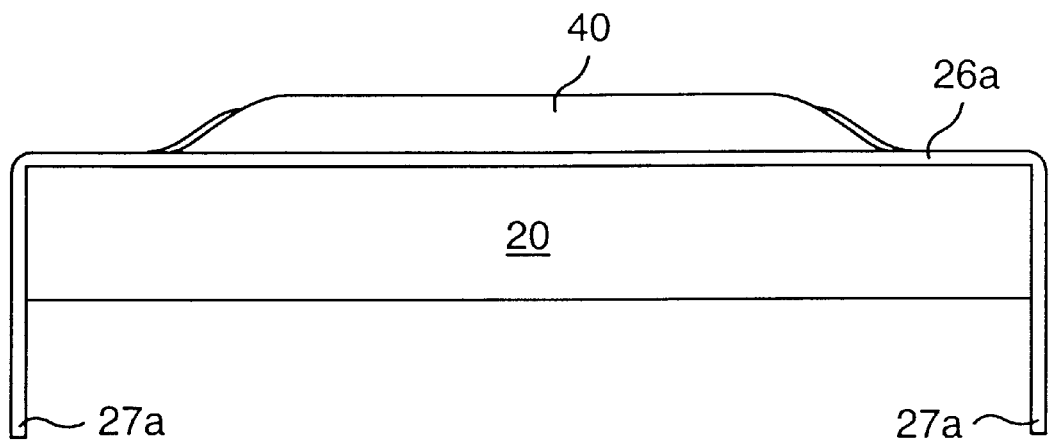
FIG. 3 is a front elevation of the traction device shown in FIG. 1.

In a preferred embodiment and as illustrated in FIG. 1, a traction device 10 is shown to include a U-shaped frame 12 comprising a pair of longitudinally extending bars 14 having forward ends 16 and rear ends 18, and a transversely extending bar 20 connecting the longitudinally extending bars 14 at forward ends 16 thereof. U-shaped frame 12 is preferably constructed of a flat strip of metal whereby the flat strip stands upright to form the longitudinally extending bars 14 and the transversely extending bar 20, as shown in FIGS. 1 and 2. Longitudinally extending bars 14 have rear end portions 19 terminating at rear ends 18. Rear end portions 19 are inwardly curved toward each other and gradually twisted along their lengths so that rear ends 18 are at an angle of about 90° or less from the upright longitudinally extending bars 14. As shown in FIGS. 2 and 3, the flat strip of longitudinally extending bars 14 and transverse bar 20 stands vertically while rear ends 18 are almost horizontal and parallel to the ground.

Figure 4:
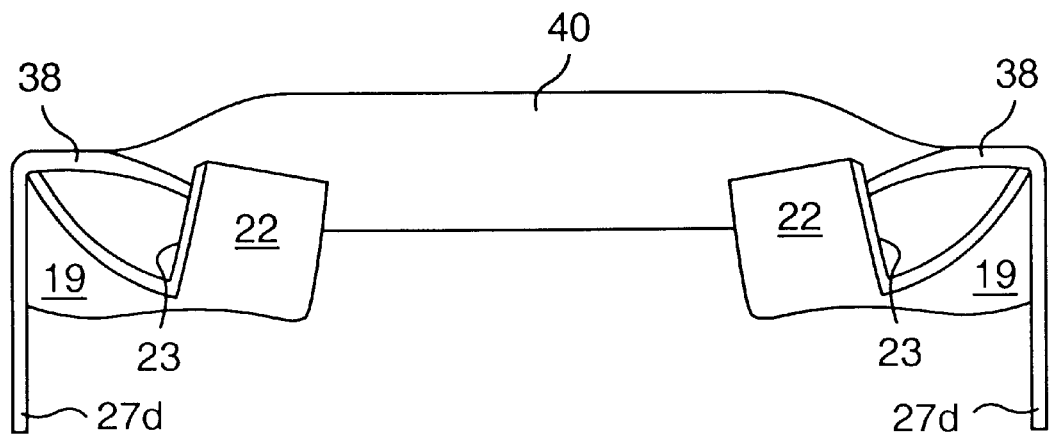
FIG. 4 is a rear elevation of the traction device shown in FIG. 1.
Figure 5:
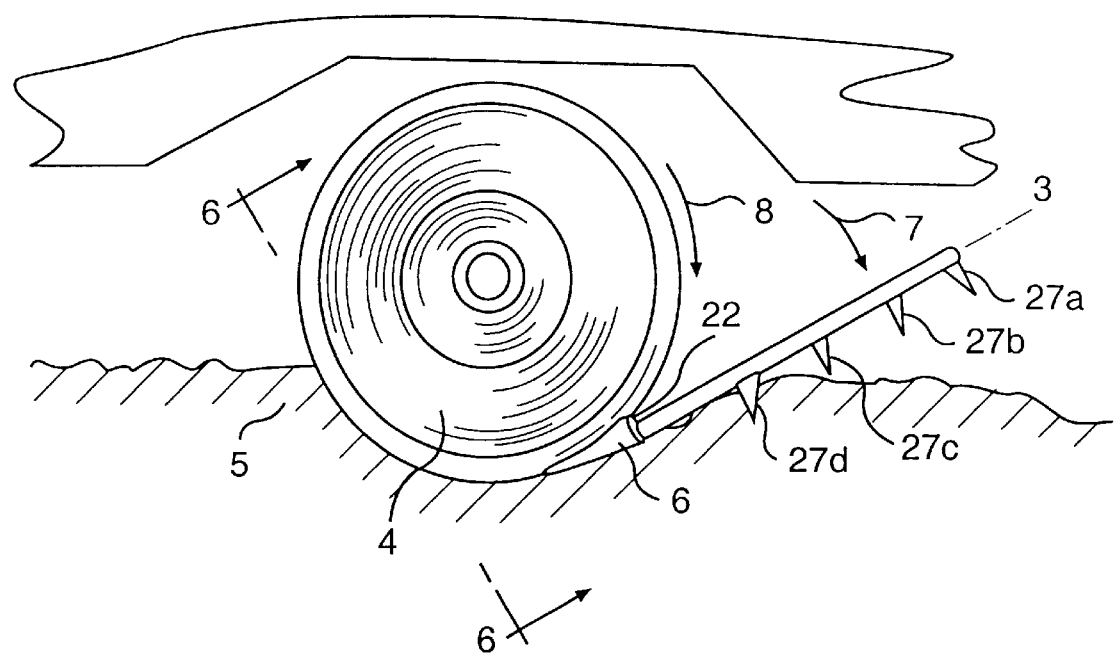
FIG. 5 is a side elevation of the traction device in an operating mode when engaged with a tire tread of a vehicle.
Figure 6:
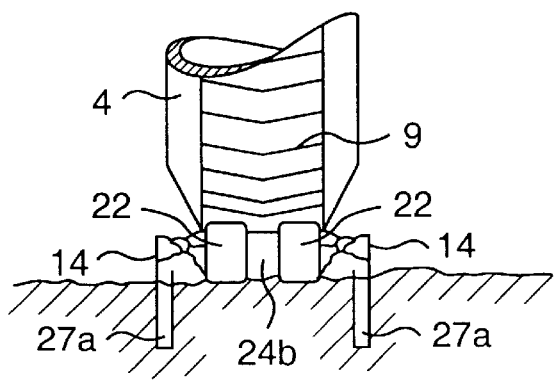
FIG. 6 is an end view as seen along line 6—6 in FIG. 5.

As shown in FIGS. 1 and 4, U-shaped frame 12 of the illustrated embodiment also includes a pair of upstanding claws 22, each claw 22 being integrally formed by bending at rear ends 18 of longitudinally extending bars 14. Claws 22 may be configured to shape like a rectangle or a square, as shown in FIG. 4, or, alternatively, may be configured to have rounded edges or an oval shape. Claws 22 extend upwardly and are substantially perpendicular to rear end portions 19 at rear ends 18 of longitudinally extending bars 14. As such, claws 22 are adapted to grip the peripheral surface of tire tread 9 (as shown in FIGS. 5 and 6) as rear ends 18 of U-shaped frame 12 are pressed into the ground. Claws 22 have outer lateral edges 23, shown in FIG. 4, spaced from each other by a distance less than the length of transversely extending bar 20.

As further shown in FIGS. 1 and 2, U-shaped frame 12 has a plurality of transverse braces 24a, 24b, 24c, and 24d having transverse portions 26a, 26b, 26c, and 26d, respectively, and corresponding pairs of traction cleats 27a, 27b, 27c, and 27d, respectively. Transverse portions 26a, 26b, 26c, and 26d extend between longitudinally extending bars 14 to provide traction grip for the vehicle tire. Cleats 27a, 27b, 27c, and 27d extend from ends of transverse portions 26a, 26b, 26c, and 26d, respectively, downwardly below U-shaped frame 12 for ground engagement and for elevating traction device 10 from the ground in some measure.

In accordance with the invention, the plurality of transverse braces include a forward-most transverse brace which has a horizontal transverse portion and a corresponding pair of traction cleats to maintain the traction device in a level posture as the tire of the vehicle passes over the forward end of the U-shaped frame. The traction cleats are provided with angle points which restrict forward movement of the traction device as the vehicle travels thereon.

In the embodiment shown in FIGS. 1 and 2, the plurality of transverse braces 24a, 24b, 24c, and 24d include a forward-most transverse brace 24a positioned at a region adjacent forward ends 16. Forward-most transverse brace 24a has a transverse portion 26a extending between the pair of longitudinally extending bars 14 and a corresponding pair of traction cleats 27a. Transverse portion 26a is preferably made of a flat strip of metal laid horizontally to provide a gradual transition for the vehicle to return onto solid ground after passing over traction device 10. Traction cleats 27a are provided to maintain traction device 10 in a level posture as the tire of the vehicle passes over forward ends 16 of the U-shaped frame 12. Preferably, traction cleats 27a have angle points 34 that can restrict forward movement of the traction device as the vehicle travels thereon. Each angle point 34 is an acute angle created at an intersection of a vertical edge 35 and an inclined edge 36. Vertical edge 35 is located near the forward ends 16. Inclined edge 36 slants downwardly toward forward ends 16 to intersect vertical edge 35 at angle point 34. Vertical edge 35 withstands lateral or horizontal forces from the rotation of the tire against the traction device 10 in a forward direction as the vehicle travels thereon. In addition, angle point 34 facilitates anchoring traction device 10 to the ground when traction device 10 is pressed into the ground by the weight of the vehicle.

Also particularly in accordance with the invention, the plurality of transverse braces include the remaining transverse braces positioned at equal intervals along the U-shaped frame. Each transverse brace is made of a flat strip, preferably metal, having horizontal side portions, a middle portion being twisted through about 90°, and a corresponding pair of traction cleats having angle points to restrict rearward movement of the traction device.

In the preferred embodiment as illustrated in FIGS. 1 and 2, the plurality of transverse braces 24a, 24b, 24c, and 24d further comprise the remaining transverse braces 24b, 24c, and 24d which are positioned at equal intervals along U-shaped frame 12. Each transverse brace 24b, 24c, or 24d is preferably made of a flat metal strip having a pair of horizontal side portions 38 with a middle portion 40 being twisted through about 90°. The remaining transverse braces 24b, 24c, and 24d also comprise corresponding pairs of traction cleats 27b, 27c, and 27d, respectively, having angle points 44 to restrict rearward movement of the traction device 10 as the vehicle travels thereon. Each angle point 44 is an acute angle created at an intersection of a vertical edge 45 and an inclined edge 46. Vertical edges 45 are located facing rear ends 18. Inclined edges 46 slant downwardly toward rear ends 18 to intersect corresponding vertical edges 45 at angle points 44. Inclined edges 46 facilitate anchoring the traction device 10 to the ground when rear ends 18 are pressed into the ground ahead of the trapped tire in the direction toward which the vehicle is driven. Vertical edges 45 restrict lateral or horizontal forces from the rotation of the tire against the traction device 10 in a rearward direction as the vehicle travels thereon.

In operation and as illustrated in FIGS. 5 and 6, the traction device 10 according to this invention is adapted to be used to produce traction between a tire 4 of a vehicle (not shown) and a slippery surface 5, such as ice, snow, mud, or sand. The traction device 10 is pressed into ground 5 ahead of tire 4 in the direction toward which the vehicle is driven, shown as arrow 3 in FIG. 5. When the entrapping material is soft, such as mud or snow, the traction device 10 is preferably inserted in a relatively steep position into a nip 6 between the ground and the peripheral tire surface such as to cause claws 22 to engage into selected cavities defined by tread 9 of tire 4, as far as possible towards the bottom of nip 6. When the entrapping material is hard, such as a smooth icy surface, claws 22 of traction device 10 need simply be placed against the trapped tire to engage with the cavities of tread 9. The traction device 10 can engage with tire 4 either at a low angle or even flat on the ground 5. Thereafter, traction device 10 is pivoted around an angular rotation in the direction of arrow 7 to cause, by a lever action, a firm engagement of claws 22 into the selected cavities of the tread and possibly engagement of cleats 27a, 27b, 27c, and 27d into the ground. When the tire rotates in a direction of arrow 8, claws 22 grip tread 9 of tire 4 and give traction to tire 4 with respect to ground 5.

Therefore, when the vehicle travels on traction device 10, the traction device 10 of this type having the pair of traction cleats 27a on the forward-most transverse brace 24a prevents rear ends 18 of U-shaped frame 12 from tilting or projected upwardly as the vehicle passes over the last one 24b of the remaining transverse braces 24b, 24c, and 24d and causing injury to a person nearby or causing damage to a vehicle undercarriage. Further, the traction device 10 of this type having the horizontal transverse portion 26a on the forward-most transverse brace 24a allows the tire to reach the ground smoothly after the vehicle passes over traction device 10. Finally, the traction device 10 of this type having the horizontal side portions 38 on the remaining transverse braces 24b, 24c, and 24d create a bouyant force to sustain the weight of the vehicle thereby impeding the vehicle from sinking into the ground.

It will be apparent to those skilled in the art that various modifications and variations can be made in the traction device designed and the material chosen for the present invention and in construction of the U-shaped frame, the plurality of transverse braces, or the traction cleats, as well as other aspects of the invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

I claim:

1. In a traction device for use in aiding a wheeled vehicle stuck in mud, snow, or other soft and slippery ground by providing a traction grip to a peripheral surface of a tire tread of the vehicle, the traction device having a U-shaped frame adapted to lie on the ground and including a pair of longitudinally extending bars having forward ends and rear ends and a transversely extending bar connecting the pair of longitudinally extending bars on the forward ends, a pair of claws, each claw defining a plate portion integrally formed on each of said rear ends of the longitudinally extending bars, the pair of claws being adapted to grip the peripheral surface of the tire tread, and a plurality of transverse braces, each brace having a transverse portion extending between the pair of longitudinally extending bars for providing traction grip to the tire and a pair of traction cleats extending from each end of the transverse bar downwardly below the U-shaped frame for ground engagement and for elevating the traction device from the around in some measure, the improvement wherein the plurality of transverse braces include:

a forward-most transverse brace positioned near the transversely extending bar, and having a transverse portion and a pair of traction cleats to maintain the traction device in a level posture as the tire of the vehicle passes over the forward end of the U-shaped frame, and wherein said traction cleats of said forward-most transverse brace have angle points to restrict forward movement of the traction device as the vehicle passes over the device.

2. In a traction device for use in aiding a wheeled vehicle stuck in mud, snow, or other soft and slippery ground by providing a traction grip to a peripheral surface of a tire tread of the vehicle, the traction device having a U-shaped frame adapted to lie on the ground and including a pair of longitudinally extending bars having forward ends and rear ends and a transversely extending bar connecting the pair of longitudinally extending bars on the forward ends, a pair of claws, each claw defining a plate portion integrally formed on each of said rear ends of the longitudinally extending bars, the pair of claws being adapted to grip the peripheral surface of the tire tread, and a plurality of transverse braces, each brace having a transverse portion extending between the pair of longitudinally extending bars for providing traction grip to the tire and a pair of traction cleats extending from each end of the transverse bar downwardly below the U-shaped frame for ground engagement and for elevating the traction device from the ground in some measure, the improvement wherein the plurality of transverse braces include:

a forward-most transverse brace positioned near the transversely extending bar, and having a transverse portion and a pair of traction cleats to maintain the traction device in a level posture as the tire of the vehicle passes over the forward end of the U-shaped frame, and wherein said transverse portion of said forward-most transverse brace is made of a flat strip of metal laid horizontally to provide a gradual transition for the vehicle after passing over the traction device.

3. The traction device of claim 1 or 2 wherein said plurality of transverse braces further include the remaining transverse braces positioned at equal intervals, each brace transverse having a transverse portion to provide a traction grip to the tire and a pair of traction cleats having angle points to restrict rearward movement of the traction device.

4. The traction device of claim 3 wherein said transverse portions of said remaining transverse braces are made of flat strips of metal, each flat strip having horizontal side portions and a middle portion being twisted through about 90° so that said horizontal side portions create a bouyant force to sustain the weight of the vehicle impeding the vehicle from sinking into the ground.

5. The traction device of claim 1 or 2 wherein said U-shaped frame is made of a flat strip of metal.

6. The traction device of claim 1 or 2 wherein said pair of longitudinally extending bars have rear end portions terminating at said rear ends, said rear end portions being inwardly curved toward each other and gradually twisted along said rear end portions so that said rear ends are at an angle of about 90° or less from said longitudinally extending bars.

7. The traction device of claim 6 wherein said pair of claws extend substantially perpendicular to said rear ends of said pair of longitudinally extending bars and said claws have outer lateral edges spaced by a distance less than the length of said transversely extending bar.

8. A traction device for use in aiding a wheeled vehicle stuck in mud, snow, or other soft and slippery ground by providing a traction grip to a peripheral surface of the tire tread of the vehicle, the traction device comprising:

a U-shaped frame adapted to lie on the ground including a pair of longitudinally extending bars having forward ends and rear ends and a transversely extending bar connecting said pair of longitudinally extending bars on said forward ends;

a pair of claws, each claw defining a plate portion integrally formed on each of said rear ends of said longitudinally extending bars, said pair of claws being adapted to grip the peripheral surface of the tire tread as said rear ends of said U-shaped frame are pressed to the ground; and a plurality of transverse braces, each brace having a transverse portion extending between said pair of longitudinally extending bars to provide traction grip to the vehicle tire and a pair of traction cleats extending from each end of said transverse portion downwardly below said U-shaped frame for around engagement and for elevating the traction device from the ground in some measure, wherein said plurality of transverse braces include a forward-most transverse brace having a transverse portion and a corresponding pair of traction cleats to maintain the traction device in a level posture as the tire of the vehicle passes over said forward ends of said U-shaped frame, and wherein said traction cleats of said forward-most transverse brace have angle points to restrict forward movement of the traction device as the vehicle passes over the device.

9. A traction device for use in aiding a wheeled vehicle stuck in mud, snow, or other soft and slippery ground by providing a traction grip to a peripheral surface of the tire tread of the vehicle, the traction device comprising:

a U-shaped frame adapted to lie on the ground including a pair of longitudinally extending bars having forward ends and rear ends and a transversely extending bar connecting said pair of longitudinally extending bars on said forward ends;

a pair of claws, each claw defining a plate portion integrally formed on each of said rear ends of said longitudinally extending bars, said pair of claws being adapted to grip the peripheral surface of the tire tread as said rear ends of said U-shaped frame are pressed to the ground; and a plurality of transverse braces, each brace having a transverse portion extending between said pair of longitudinally extending bars to provide traction grip to the vehicle tire and a pair of traction cleats extending from each end of said transverse portion downwardly below said U-shaped frame for around engagement and for elevating the traction device from the ground in some measure, wherein said plurality of transverse braces include a forward-most transverse brace having a transverse portion and a corresponding pair of traction cleats to maintain the traction device in a level posture as the tire of the vehicle passes over said forward ends of said U-shaped frame, and wherein said transverse portion of said forward-most transverse brace is made of a flat strip laid horizontally to provide a gradual transition for the vehicle after passing over the traction device.

10. The traction device of claim 8 or 9 wherein said plurality of transverse braces further include the remaining transverse braces positioned at equal intervals, each transverse brace having a transverse portion to provide a traction grip to the tire and a corresponding pair of traction cleats having angle points to restrict rearward movement of the traction device.

11. The traction device of claim 10 wherein said transverse portion of said remaining transverse braces are made of flat strips, each having horizontal side portions and a middle portion being twisted through about 90° so that said horizontal side portions create a bouyant force to sustain the weight of the vehicle thereby impeding the vehicle from sinking into the ground.

12. The traction device of claim 8 or 9 wherein said U-shaped frame is made of a flat strip of metal.

13. The traction device of claim 8 or 9 wherein said pair of longitudinally extending bars have rear end portions terminating at said rear ends, said rear end portions being inwardly curved toward each other and gradually twisted along said rear end portions so that said rear ends are at an angle of about 90° or less from said longitudinally extending bars.

14. The traction device of claim 13 wherein said pair of claws extend substantially perpendicular to said rear ends of said pair of longitudinally extending bars, and have outer lateral edged spaced by a distance less than the length of said transversely extending bar.

* * * * *

UNITED STATES PATENT AND TRADEMARK OFFICE
CERTIFICATE OF CORRECTION

PATENT NO. : 6,129,289
DATED : October 10, 2000
INVENTOR(S) : Robert M. Morin, Jr.

It is certified that error appears in the above-identified patent and that said Letters Patent is hereby corrected as shown below:

Column 5, claim 1,
Line 60, "around" should read -- ground --.

Column 6, claim 3,
Lines 36 & 37, "brace transverse" should read -- transverse brace --.

Column 7, claim 8,
Line 14, "around" should read -- ground --.

Column 8, claim 9,
Line 3, "around" should read -- ground --.

Column 8, claim 14,
Line 42, "lateral edged" should read -- lateral edges --.

Signed and Sealed this

Eleventh Day of December, 2001

*Attest:*

*Attesting Officer*

NICHOLAS P. GODICI
*Acting Director of the United States Patent and Trademark Office*